(12) United States Patent
Rall

(10) Patent No.: US 11,090,545 B2
(45) Date of Patent: Aug. 17, 2021

(54) WIRELESS CUSTOMIZABLE REFEREE PAGING SYSTEM

(71) Applicant: Samuel W. Rall, Chicago, IL (US)

(72) Inventor: Samuel W. Rall, Chicago, IL (US)

( * ) Notice: Subject to any disclaimer, the term of this patent is extended or adjusted under 35 U.S.C. 154(b) by 41 days.

(21) Appl. No.: 16/705,410

(22) Filed: Dec. 6, 2019

(65) Prior Publication Data

US 2020/0298090 A1 Sep. 24, 2020

Related U.S. Application Data

(60) Provisional application No. 62/821,344, filed on Mar. 20, 2019.

(51) Int. Cl.
*A63B 71/06* (2006.01)
*H04W 76/14* (2018.01)
*H04W 4/80* (2018.01)

(52) U.S. Cl.
CPC .......... *A63B 71/0605* (2013.01); *H04W 4/80* (2018.02); *H04W 76/14* (2018.02); *A63B 2071/0655* (2013.01)

(58) Field of Classification Search
USPC ........................................................ 700/91
See application file for complete search history.

(56) References Cited

U.S. PATENT DOCUMENTS 6,256,325 B1 * 7/2001 Park .................. H04L 7/041
370/503
9,092,952 B1 7/2015 Daniel
(Continued)

FOREIGN PATENT DOCUMENTS

EP 0 678 837 A1 10/1995
WO 03/035190 A1 5/2003

OTHER PUBLICATIONS

ErvoCom Schweiz AG, "Referee Paging System RPS 2156 User manual", www.ervocom.ch, May 25, 2016. Retrieved on Apr. 27, 2020. Retrieved from <URL: https://www.spintso.se/UserFiles/Archive/334/dokument/User_Manual_RPS2156_V1.1_Ervocom_-_new.pdf> entire document, 7 pages.

(Continued)

*Primary Examiner* — Pierre E Elisca
(74) *Attorney, Agent, or Firm* — Epiphany Law, LLC

(57) ABSTRACT

A wireless customizable referee paging system is disclosed. The system includes at least two flag signaling components, each flag signaling component having an electronic signature to send a unique flag signal based on a flag user's input for that flag signaling component. The system includes a central receiving component that receives the unique flag signal from each flag signaling component and then alerts a central user to receipt of the unique flag signal. The flag signaling components and the central receiving component each having a Bluetooth® radio circuit and thereby the flag signaling components communicate with the central receiving component substantially exclusively via Bluetooth® technology. The flag signaling components and the central receiving component each have a pairing-mode and a signaling-mode. The pairing-mode uniquely pairs each flag signaling component to the central receiving component. The signaling-mode restricts each flag signaling component communicating with the central receiving component.

20 Claims, 10 Drawing Sheets

(56) References Cited

U.S. PATENT DOCUMENTS

| | | | |
|---|---|---|---|
| 9,462,415 B2* | 10/2016 | Jung | H04M 3/42348 |
| 9,953,195 B2 | 4/2018 | Turner et al. | |
| 2003/0049590 A1* | 3/2003 | Feldbau | A63B 71/0605 |
| | | | 434/251 |
| 2005/0049080 A1 | 3/2005 | Hovington | |
| 2005/0162257 A1* | 7/2005 | Gonzalez | A63B 71/0605 |
| | | | 340/323 R |
| 2010/0304674 A1 | 12/2010 | Kim et al. | |
| 2011/0313922 A1 | 12/2011 | Ayed | |
| 2014/0266776 A1 | 9/2014 | Miller et al. | |
| 2015/0149837 A1 | 5/2015 | Alonso et al. | |
| 2015/0237467 A1* | 8/2015 | Jung | H04W 4/02 |
| | | | 455/414.2 |
| 2017/0034690 A1 | 2/2017 | Breckman et al. | |
| 2020/0351108 A1* | 11/2020 | Moriyama | H04L 9/3271 |

OTHER PUBLICATIONS

International Preliminary Report on Patentability for PCT Patent Application No. PCT/US2020/021683, "Wireless Customizable Referee Paging System" dated Feb. 16, 2021, 20 pages.

Transmittal, Written Opinion, and Search Report for PCT Patent Application No. PCT/US2020/021683, "Wireless Customizable Referee Paging System" dated Jun. 2, 2020, 12 pages.

* cited by examiner

Flag Signaling Component (FSC)

500 When FSC is Turned ON

↓

501 FSC Enters Paring Mode

↓

502 NFC Communication
FSC is Placed (one at a time) on CRC to Pair

↓

503 FSC is Paired

↓

504 FSC Enters Signaling Mode

Central Receiving Component (CRC)

505 When CRC is Turned ON

↓

506 CRC Enters Pairing Mode, waits for FSCs to Pair with

↓

507 FSC is added to the System

↓

508 When Mode Button is Pressed, Indicates all Intended FSCs have been added

↓

509 CRC Enters Signaling Mode

Fig. 9

Flag Signaling Component (FSC)

Central Receiving Component (CRC)

600 When FSC is Turned ON

605 When CRC is Turned ON

601 FSC Enters Paring Mode

606 CRC Enters Pairing Mode, waits for FSCs to Pair with

602 Bluetooth Pairing Process
While in Paring Mode, all the intended FSCs to be added to the System are placed within 3 meters of the CRC 607 FSC is added to the System 603 FSC is Paired 608 When Mode Button is Pressed, Indicates all Intended FSCs have been added 604 FSC Enters Signaling Mode 609 CRC Enters Signaling Mode

Fig. 10

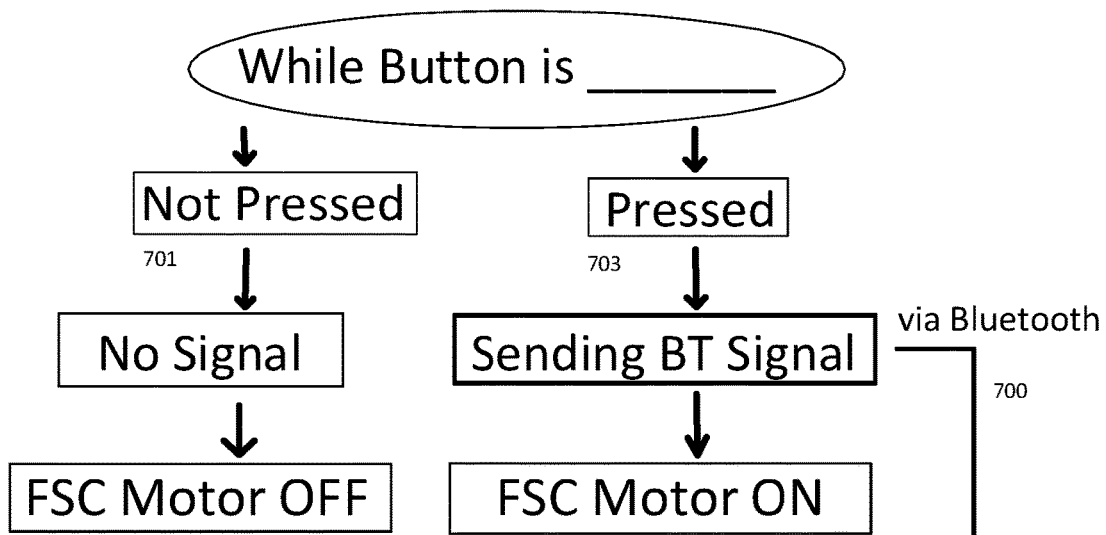
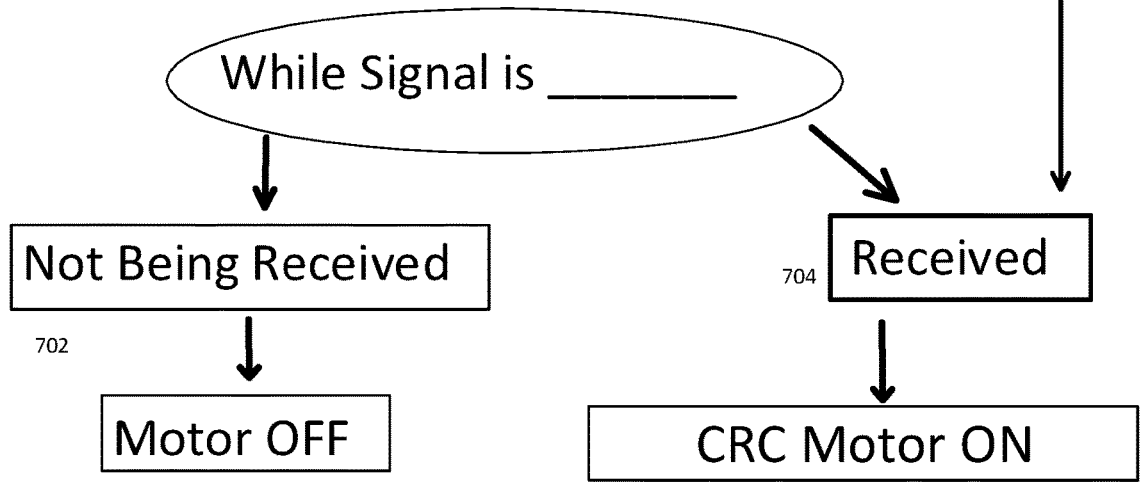
Fig. 11

WIRELESS CUSTOMIZABLE REFEREE PAGING SYSTEM

CROSS-REFERENCE TO RELATED APPLICATION

This application claims the benefit of U.S. Provisional Application No. 62/821,344, filed Mar. 20, 2019, and titled: REFEREE PAGING SYSTEM.

TECHNICAL FIELD

This invention relates to radio frequency (RF) communication and, more particularly, to systems, methods, apparatuses, computer readable media and other means for signaling or confirming a foul or other action having taken place on a playing field by one game official to another game official.

BACKGROUND

For every soccer game, there are usually three referees on the field who are in charge of enforcing the Laws of the Game: the Referee and two Assistant Referees, or ARs. The Referee runs with the players directly on the field, keeping up with play so that they may be in the best position to make calls. The ARs, equipped with a flag, run with the players up and down the sideline and also have specific responsibilities of enforcing the rules. When the AR spots an infraction, they alert the Referee by raising their flag who, once spotted, blows the whistle to stop play and enforce the infraction. This system of communication between the referees is CRUCIAL: because if the Referee fails to spot the AR's flag, enforcing the rules in this situation suddenly becomes extremely difficult and the result is almost always unfavorable to one or both teams. As a result of the challenges encountered in a purely person to person communication process, electronic communication devices and systems have been introduced.

The existing electronic devices and systems generally comprise a flag for waving to visually indicate that a situation has been observed, a shaft on which the flag is loosely attached, a handle that supports the shaft and is integral therewith, and electronics contained in the handle for sending an electromagnetic signal through an antenna. A switch activated by the user of the flag energizes the radiation means to cause the electromagnetic signal to be broadcast from the antenna to a receiving device carried by another referee officiating this game. Current art includes these electronic devices that employ low-frequency radio communication to alert the receiving device when the button on the flag shaft is pressed. Systems also exist for coaching players and the identification of the position of players on the field.

The cost of the parts required in the assembly of existing devices is unfortunately very high. This causes the consumer price of the system to put the product in a market for only referees that work semi-professional and professional matches. For example, the analog nature of the current art devices requires several expensive parts and design practices that result in a much less affordable off-the-shelf product. Current art features several components that require a lot of electronic power that must be supplied by the battery housed within the handle of the official's flag. In order to design a product that can use this much electronic power while being housed within a handheld mobile device requires a high performing and expensive battery.

Moreover, existing systems are often sold as a unit containing all three components that cannot be interchanged with components of other like systems. That is, current art that does not feature interchangeability is sold in grouped systems whose components must be used within that same system for the lifetime of the product. This reduces the affordability of the product since the failure of one component requires the replacement of the system. Additional limitations include the possible cancellation of the signals when both ARs press their button at the same time. The result of this scenario is the Referee receiving no signal at all and both Assistants could go unnoticed.

Accordingly, there is the need for new devices and a system to address these shortcomings, as well as bring other advantages not before possible.

SUMMARY

Because of the importance of a Referee actually witnessing their Assistant's flag, a system of handheld electronic devices was developed so that the Assistant could simply press a button on the handle of the flag shaft and alert the Referee, who would be signaled by, for example, a sensory vibration or an audible beep via a module secured to their person, often to their arm. Even more particularly, with the present invention my referee paging system utilizes Bluetooth® (BT) technology, a much more reliable and robust wireless protocol for many forms of data, rather than low-frequency radio. For example, BT is a digital wireless communication system that relies on a uniform timing system to send and receive digital data packets between two or more devices. BT transmitters and receivers use ultra-high frequency (UHF) radio waves to transmit within the 2.4-2.485 GHz frequency band. This band is called the Industrial, Scientific and Medical (ISM) band and is unlicensed but not unregulated. The data being transmitted is broken up into digital packets that are sent or received at specific time intervals as defined per each individual BT system. Most BT systems operate through a central-peripheral architecture, in which the central device dictates the timing intervals and can send and receive packets between several connected peripheral devices. The reliability of the BT communication for my invention, as opposed to other RF transmission protocols, stems from the adoption of frequency-hopping spread spectrum technology. This means each data packet being transmitted might not necessarily be transmitted at the same frequency as the previous one or the next packet. The "hopping" of the frequencies allows for immensely complex patterns for each device to follow, allowing for better communication and less interference.

For comparison, two transistor radios using older technology and tuned into the same "channel" would be able to communicate. However, any other radio separate from the original two that is tuned into the same channel would also be able to listen and potentially interrupt communication on that channel with intended or unintended noise. BT for my invention can solve this problem by "hopping" between different channels in an incredibly complex pattern that is agreed upon and followed only by the intended devices, thereby allowing just these intended devices to receive and transmit an entire, uninterrupted signal that is completely intact. Still further, BT technology has been revised and updated since its invention by using different combinations of software and hardware architecture. BT 5, for example, was released by the Bluetooth Special Interest Group (SIG) in June of 2016 and includes a new software architecture that utilizes longer data packet lengths. The resulting features of this change include different combinations of longer range, stronger transmission signal, faster rates of communication, and a much lower power consumption. Further, my invention is able to combine desired capabilities from BT 4 and BT 5 to achieve a low-cost, simple and just-as-needed referee paging system that can be available to all range of users and not just the financially well to do or professional types.

In some embodiments, my invention is a wireless customizable referee paging system with universal and interchangeable components. The system includes at least two flag signaling components. Each flag signaling component has an electronic signature to send a unique flag signal based on a flag user's input for that flag signaling component. A central receiving component receives the unique flag signal from each flag signaling component and then alerts a central user to receipt of the unique flag signal. The flag signaling components and the central receiving component each have a Bluetooth® radio circuit and thereby the flag signaling components communicate with the central receiving component substantially exclusively via Bluetooth® technology. The flag signaling components and the central receiving component each have a pairing-mode and a signaling-mode. In the pairing-mode each flag signaling component is uniquely paired to the central receiving component based on the electronic signature of the flag signaling component. In the signaling-mode each flag signaling component communicates substantially only with the central receiving component to which the flag signaling component is paired for as long as the flag signaling component is paired to that central receiving component.

In other embodiments of the invention, there is a wireless customizable referee paging system with universal and interchangeable components. The system includes at least two flag signaling components. Each flag signaling component has an electronic signature to send a unique flag signal based on a flag user's input for that flag signaling component, and each flag signaling component has a flag projecting out an end of the flag signaling component for officiating a sporting event. Ideally, though not required, the user uses a same hand for officiating the sporting event as for sending the unique flag signal. A central receiving component receives the unique flag signal from each flag signaling component and then alerts a central user to receipt of the unique flag signal, and each flag signaling component has a flag alert activated in combination with the unique flag signal. The flag signaling components and the central receiving component each have a Bluetooth® radio circuit and thereby the flag signaling components communicate with the central receiving component substantially exclusively via Bluetooth® technology. The central receiving component can consist essentially of the following electronic sub-components—a microprocessor in communication with each of: a mode button, a rumble motor, an indicator light, a charging port, a battery, an on/off switch and the Bluetooth® radio circuit. The flag signaling components and the central receiving component each have a pairing-mode and a signaling-mode. In the pairing-mode each flag signaling component is uniquely paired to the central receiving component based on the electronic signature of the flag signaling component. In the signaling-mode each flag signaling component communicates substantially only with the central receiving component to which the flag signaling component is paired for as long as the flag signaling component is paired to that central receiving component.

Also described herein are embodiments directed to configuration of the components, how signals are communicated between components and the way that a signal is made known to the user of the components.

Other embodiments are particular to the configuration and type of sub-components, or how components are paired together, all to advantage this system's simplicity and cost-effective construction.

BRIEF DESCRIPTION OF THE DRAWINGS

The invention may be more completely understood in consideration of the following detailed description of various embodiments of the invention in connection with the accompanying drawings, in which:

FIG. 9 is a flow chart of a pairing-mode for the components seen in FIGS. 1 and 4;

FIG. 10 is a flow chart of an alternate pairing-mode for the components seen in FIGS. 1 and 4; and, FIG. 11 is a flow chart of a signaling-mode for the components seen in FIGS. 1 and 4 once they have been paired.

Figure 1:
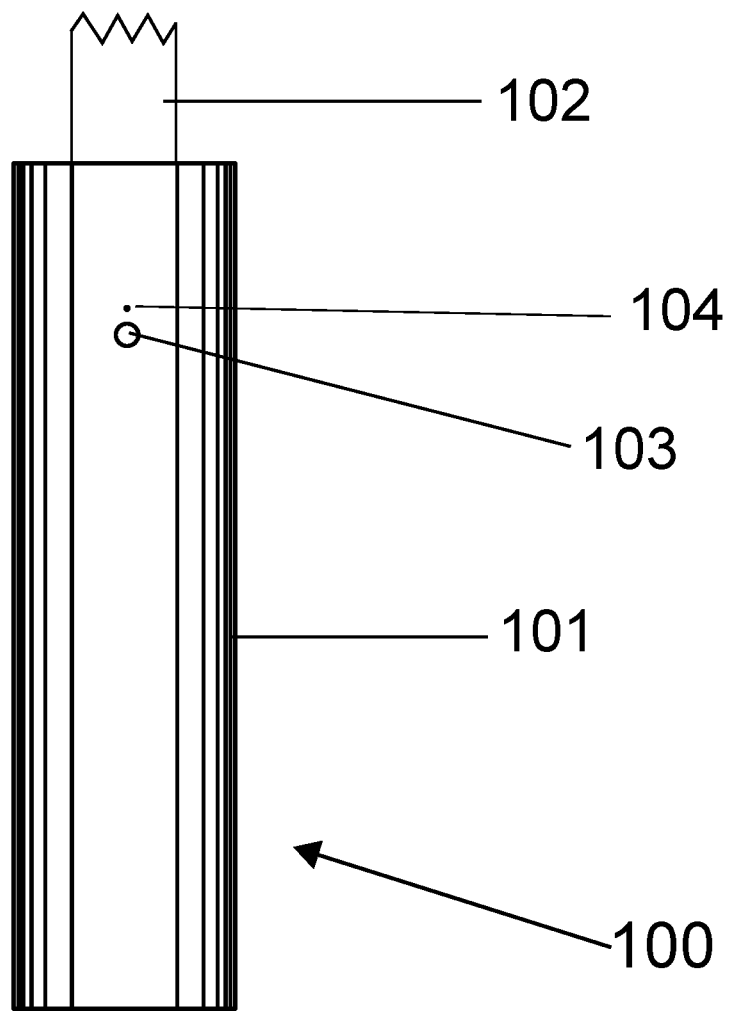
FIG. 1 is a front view of a flag signaling component of the invention.

The drawings show some but not all embodiments. The elements depicted in the drawings are illustrative and not necessarily to scale, and the same (or similar) reference numbers denote the same (or similar) features throughout the drawings.

DETAILED DESCRIPTION

In accordance with the practice of at least one embodiment of the invention, as seen in FIGS. 1-8 for example, there is a wireless customizable referee paging system with universal and interchangeable components 100 and 200. The system includes at least two flag signaling components, like 100. Each flag signaling component has an electronic signature (explained further herein) to send a unique flag signal based on a flag user's (not specifically shown) input for that flag signaling component, e.g., the user depressing signal button 103. In physical structure and operation, preferably but not required, each flag signaling component has a flag 102 projecting out an end of the flag signaling component for officiating a sporting event. Still further, the user can use a same hand for officiating the sporting event as for sending the unique flag signal, e.g., by depressing button 103.

A central receiving component 200 receives the unique flag signal from each flag signaling component and then alerts a central user (not specifically shown) to receipt of the unique flag signal. The flag signaling components 100 and the central receiving component 200 each have a Bluetooth® radio circuit 301, 401, respectively, as part of their electronic sub-components and thereby the flag signaling components communicate with the central receiving component via Bluetooth® technology, and preferably doing so substantially exclusively via BT technology.

The flag signaling components and the central receiving component each have a pairing-mode and a signaling-mode. In the pairing-mode each flag signaling component 100 is uniquely paired to the central receiving component 200 based on the electronic signature of the flag signaling component. In the signaling-mode each flag signaling component 100 communicates substantially only with the central receiving component 200 to which the flag signaling component is paired for as long as the flag signaling component 100 is paired to that central receiving component 200.

Without being limited to a theory of understanding, it is the features of the invention, and generally due to use of BT technology as taught herein, that makes this invention so simple and an expeditious way of confirming the occurrence of a situation in a sporting field event such that the officials need not take their eyes from the play. That is, the alert to the central user is done discreetly between the central receiving component and the central user. For example, this can be accomplished by the alert being a vibratory alert to the central user, namely, to their arm where the component 200 is attached. Alternately, it could be a low volume beep from the component 200 at a level only significantly detectable by the central user. Further, additional haptic feedback can be incorporated into the system such that each flag signaling component includes a flag alert activated in combination with the unique flag signal. For example, the flag alert could be a flag vibratory alert to the flag user, or it could be a low volume beep from the component 100 at a level only significantly detectable by the flag user.

Figure 2:
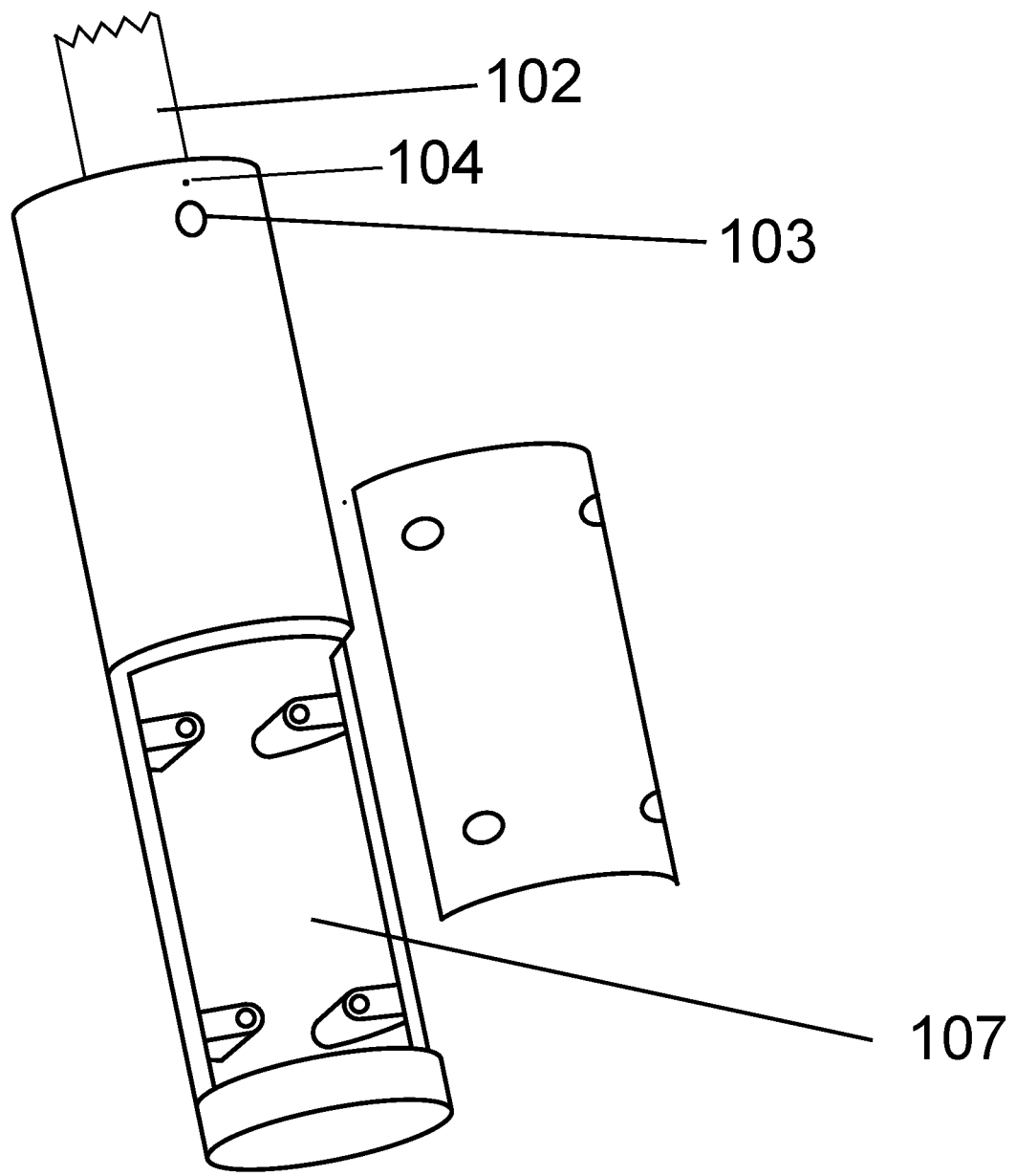
FIG. 2 is a perspective, back, partial disassembled view of that in FIG. 1.
Figure 3:
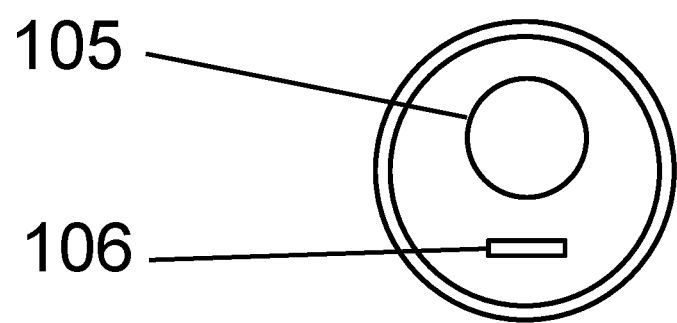
FIG. 3 is an end view of that in FIG. 1.

Referring to FIGS. 1-3, specifically, there is the flag signaling component 100, in accordance with an exemplary embodiment. The basic form is an elongated handle 101 as a cylinder approximately 6-8 inches in length and 1-2 inches in diameter, designed to be comfortably handheld for long periods of time. This is a non-limiting example as any handle form that has a cavity 107 to appropriately contain the electronic sub-components, and be connected to the flag 102, may be used. This component 100 should be waterproof, rechargeable, and comfortable to hold for long periods of time. It includes a signal button 103 and indicator light 104, such as a LED. Handle 101 also includes an on/off switch 105 and a charging port 106, such as a USB. It should be noted that this is not to be considered a limiting example. Other parts may be added or changed to accomplish the basic functions described as the invention. For example, other types of charging may be used with the present invention. Charging may be performed by inductive charging, wireless charging, contact charging or by any other appropriate means. It should be noted that watertight devices may use inductive or wireless charging. Depending on the charging type a docking unit or charging cord may be provided.

Figure 4:
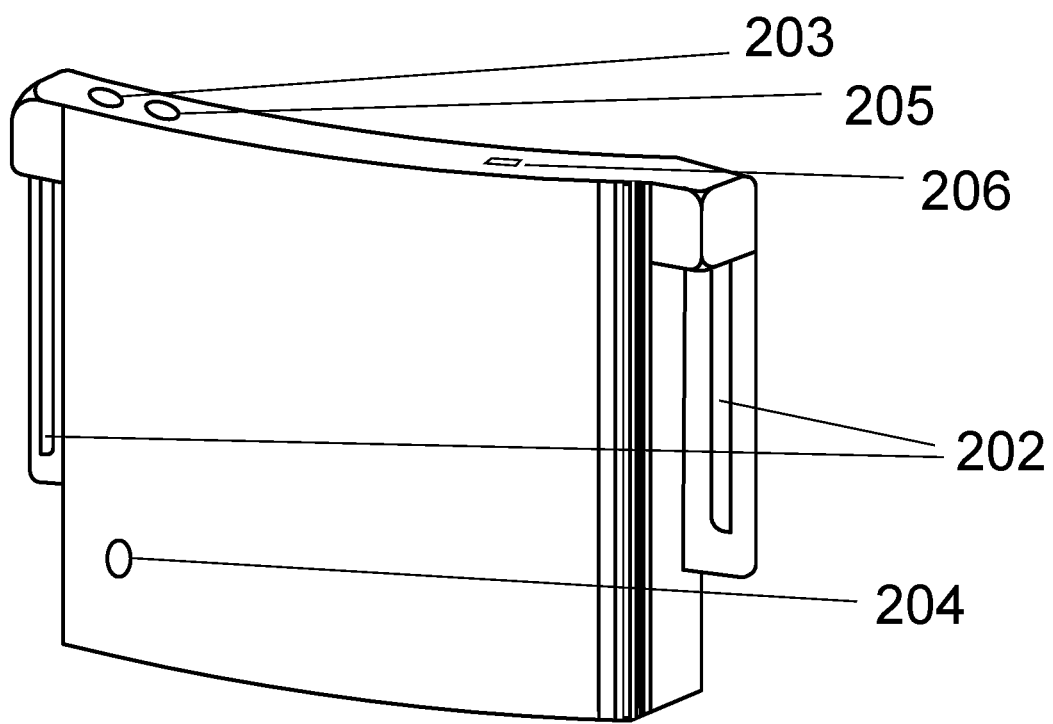
FIG. 4 is a perspective view of a central receiving component of my invention.
Figure 5:
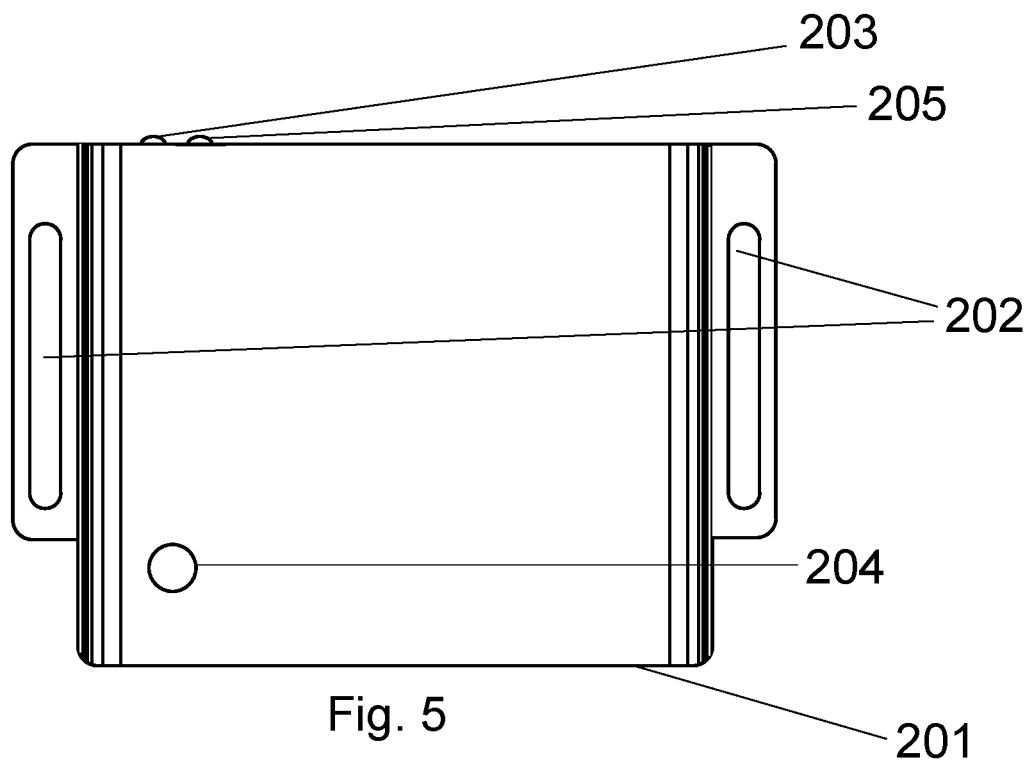
FIG. 5 is a front view of that in FIG. 4.
Figure 6:
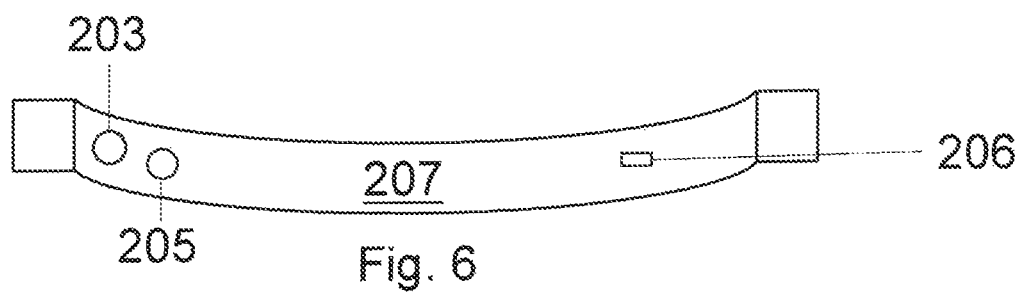
FIG. 6 is a top view of that in FIG. 4.
Figure 7:
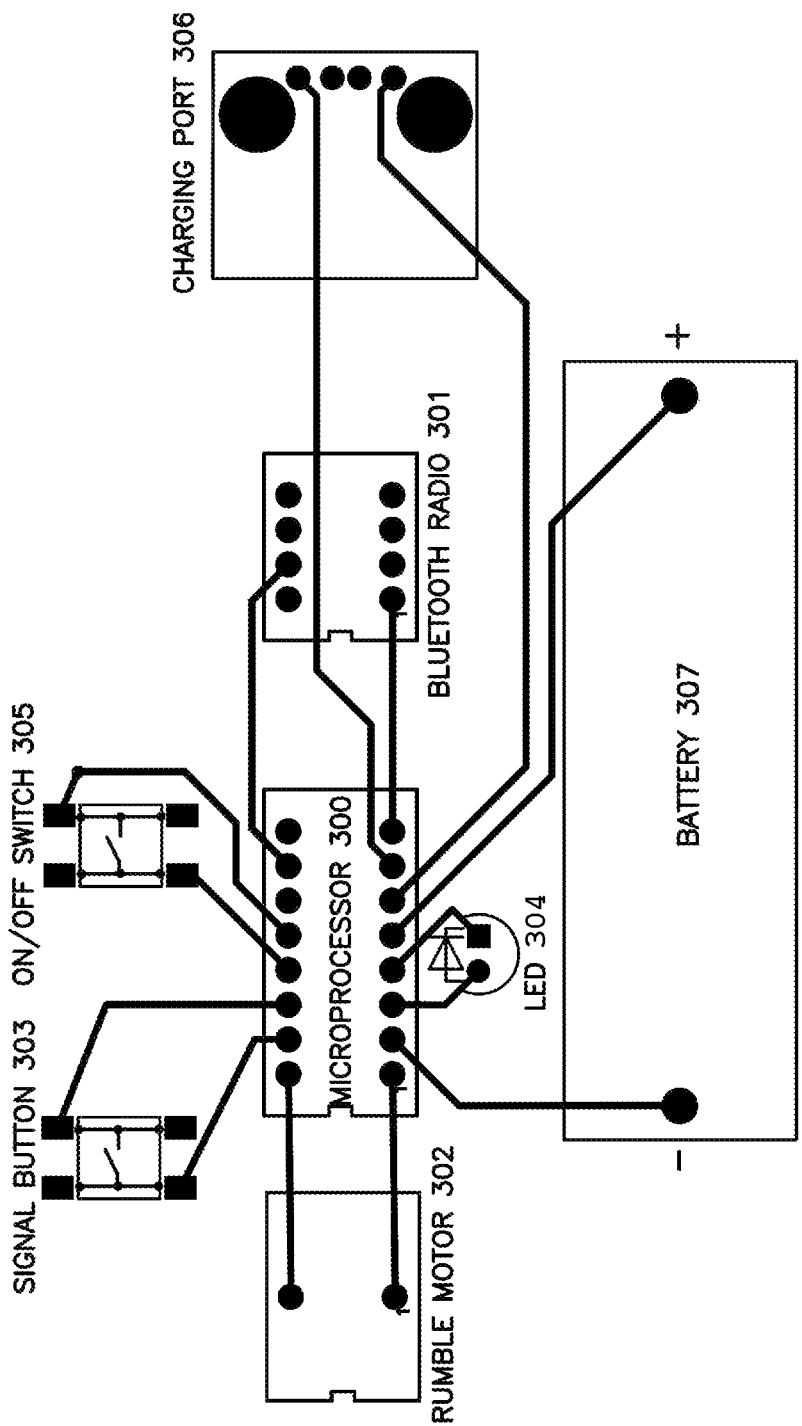
FIG. 7 is a schematic view of flag electronic sub-components of the flag signaling component seen in FIG. 1.
Figure 8:
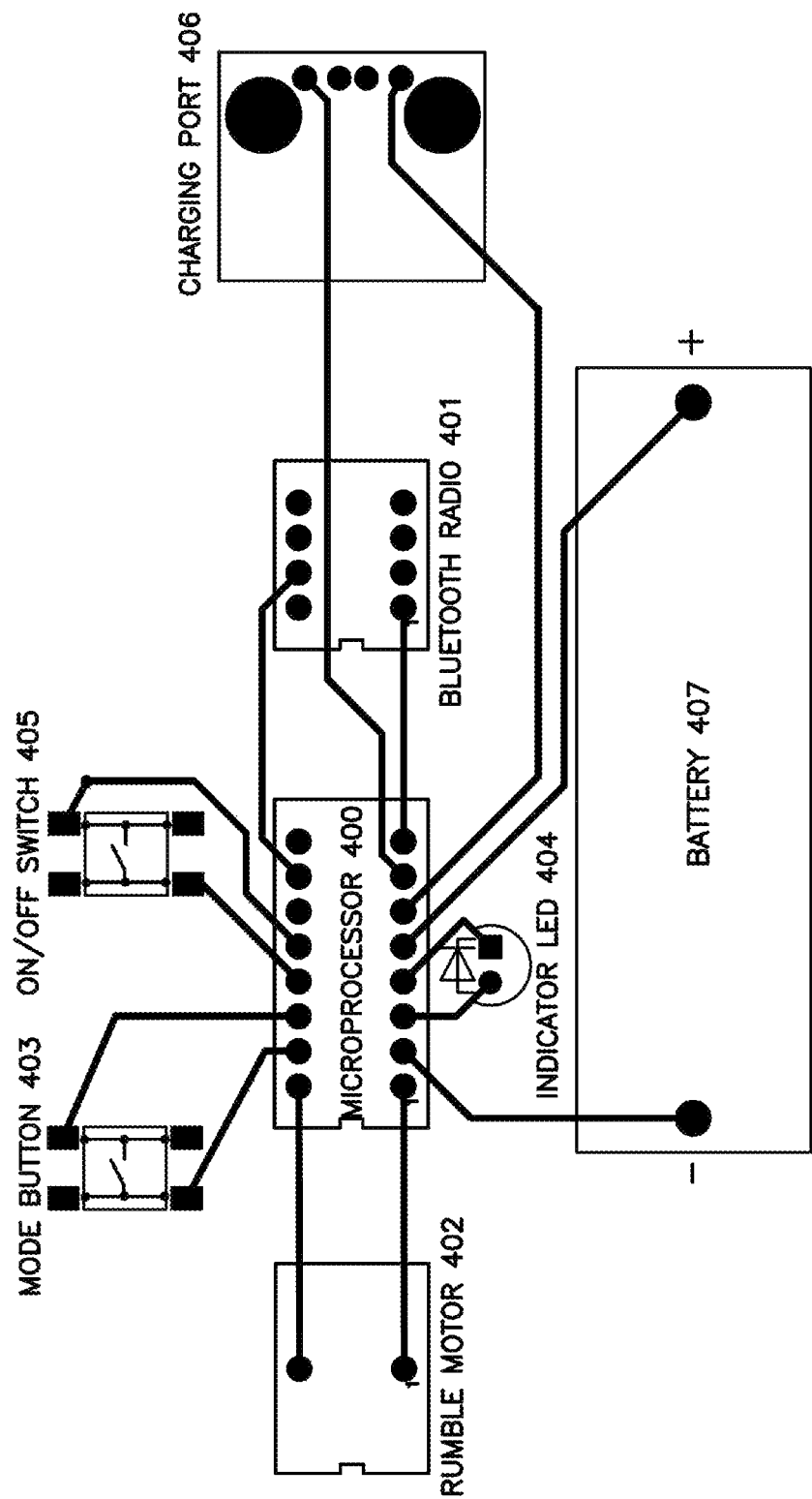
FIG. 8 is a schematic view of central component sub-components of the central receiving component seen in FIG. 4.

Turning to FIGS. 4-6, specifically, there is the central receiving component 200, in accordance with an exemplary embodiment. The basic form is a small box approximately 4-6 inches in length, 4-6 inches in width, and 0.5-1.5 inches in depth. This component should also be rechargeable and waterproof. The module 200 includes the LED indicator 204, mode button 203, and flanges 202 for the hook and loop, Velcro™ type, straps used to secure the module to the Referee's person. Located within the central receiving component module housing 201 is the electronics and motors whose function is to receive Bluetooth signals from the other components and alert the Referee. It should be noted that this is not to be considered a limiting example. Other parts may be added or changed to accomplish the basic functions of the invention. As with the flag signaling component, other types of charging may be used with the present invention. Charging may be performed by inductive charging, wireless charging, contact charging or by any other appropriate means. It should be noted that watertight devices may use inductive or wireless charging. Depending on the charging type a docking unit or charging cord may be provided.

An added benefit flowing from the invention is a system that does not require significant training in the use thereof and components 100 and 200, due to their simple configurations and operation, that will improve the accuracy and hence the sporting basis for field sporting events and the officiating thereof such that play may be properly interrupted when a situation has occurred and the appropriate action is taken without undue demonstrations from the officials. System 200 is also able to communicate with components 100 over the entire length of a soccer pitch (around a maximum of 170 meters), and without fear of compromising the system due to the players that may be in the path of line of sight between components 100, 200. In addition to the use of BT technology as discussed herein, to get the desired range of transmission, it can be advantageous to use a BT antenna, and preferably for example, employing BT 4.1 protocols and a long range BT antenna. It may also be helpful to use other BT protocols and in particular the mixing of BT protocols, for example, BT 4 and BT 5 protocols, as would be known to one of ordinary skill in the art in combination with the teachings herein to practice the features of the invention.

Additional advantages of the invention are the way its sub-components and programming utilize electromagnetic energy in a specific manner that does not interfere with the use of radio and electromagnetic waves by others at field sporting events or other systems. As such, the system 200 is very able to function near other systems without sending transmissions to an unintended receiver. And, system 200 is highly resistant to electromagnetic noise and interference that would cause false or blocked signals. Further, the system 200 can provide a level of signal encryption and better eliminate the risk of signal cancellation. To achieve these features, the invention uses BT technology, namely combinations of BT 4 and BT 5 as one of ordinary skill in the art would know to do in light of the teachings herein. Further, and as stated earlier, because BT is a digital technology the invention can employ a unique code written into the BT radio circuit of each flag signaling component 100, known as Software on Chip (SoC) architecture. Thus, each BT radio circuit is designed so it allows for multiple flag signaling components to be recognized and added to the overall system by the central receiving component without conflicting with each other, due to the unique electronic signature of each flag signaling component, thereby producing a unique flag signal for each flag signaling component. Further, for example, this can ensure that in the event of both ARs simultaneously sending a signal to the Referee the signals do not get cancelled and the procedure is electronically handled appropriately. The unique software codes embedded into the BT radio circuit also equip the system with a level of encryption that would otherwise be impossible for existing handheld electronics to achieve through an analog system. As such, the unique flag signal can be encrypted when it communicates between the flag signaling component and the central receiving component, for added security to and uncompromised performance of the referee paging system. Further related to this security and consistent performance without interference given or received, is in the signaling-mode so the central receiving component recognizes substantially only the flag signaling components to which it is paired for as long as those flag signaling components are paired to that central receiving component.

It cannot be stated enough, this invention is also different than the current art because it does not rely on the complicated and intensely engineered analog radio transmission protocol. The referee paging system provides a significantly more economical product that can perform just as well, and in many regards better than the current art, by using BT technology as taught herein. Employing BT technology for long range signal transmission requires fewer electronic components that are smaller, lighter and cheaper than current art. BT radio transmission is largely a digital transmission protocol and therefore does not require as intense signal conditioning and electronic power like analog transmissions. As such, each flag signaling component of the invention, preferably, consists essentially of the following electronic sub-components—a microprocessor 300 in communication with each of: a signal button 303, a rumble motor 302, an indicator light 304 (e.g., a LED), a charging port 306 (e.g., for USB), a battery 307, an on/off switch 305 and the Bluetooth® radio circuit 301. In a similar regard, and as a standalone feature or in combination with the sub-component features of the flag signaling component 100, the central receiving component 200, preferably, consists essentially of the following electronic sub-components—a microprocessor 400 in communication with each of: a mode button 403, a rumble motor 402, an indicator light 404 (e.g., a LED), a charging port 406 (e.g., a USB), a battery 407, an on/off switch 405 and the Bluetooth® radio circuit 401. Even more preferably, the referee paging system 10 has each flag signaling component consisting essentially of the same type of electronic sub-components as the central receiving component.

Referring to FIGS. 9-11, exemplary operation of the referee paging system is depicted. Once the components 100 and 200 are assembled as taught herein, including appropriate software as would be known to one of ordinary skill in the art in combination with the teachings to achieve the desired features of the invention, and in particular the electronic signature to give each signaling component 100 a unique flag signal, components 100 are added to the desired component 200 by "pairing" and thus forming the referee paging system. The system could have 2, 3, or more flag signaling components, as desired by the Referee and ARs. There are various ways that components 100 and 200 can be paired, and such would be known to one of ordinary skill in the art in combination with the teachings to achieve the desired features of the invention.

Specifically referring to FIG. 9, Near-Field Communication (NFC) technology is used to pair the flag signaling components and the central receiving component. This can happen using the following steps. Each flag signaling component is turned on at 500. The flag signaling components enter pairing mode 501. The central receiving component is turned on at 505. The central receiving component enters the pairing mode and waits for components 100 to be paired with component 200. The central receiving component is placed into pairing-mode by pressing the mode button 203 (FIG. 4) and is indicated as such by means of indicator light 204 (FIG. 4). The first flag is placed on the central receiving component at 502. That is, physically each component 100, when in pairing-mode 501, is placed on the central receiving component and, by means of NFC technology at 502, the unique identifying number of that particular component is sent to the central receiving component. The first flag is recognized by the central receiving component at 507. The central receiving component 200 is programmed to add this unique ID or electronic signature to a list of accepted devices to form the referee paging system. The first flag is added to the central receiving component at 506. The first flag signaling component is paired at 503. The first flag enters normal function mode at 504. This procedure can be repeated for additional components 100, as desired. Then, the mode button on the central receiving component is pressed indicating that all intended components 100 have been added at 508. The central receiving component enters normal function mode at 509. This exact process of pairing may vary depending on the BT technology employed, as would be known to one of ordinary skill in the art in combination with the teachings to achieve the desired features of the invention.

Once in signaling-mode again at 504, 509, the central receiving component only accepts BT signals from devices on the list of "paired" devices and rejects all other signals. It is important to note that NFC does not replace BT technology in the system. The range, speed, and strength of communication for the components of the invention are far out of the realm of NFC capabilities. It is the pairing process only that utilizes NFC technology for the invention. Once the components are paired, they communicate using BT technology.

NFC functions at a wireless connection range of around 4 cm. The intended data sent from one device to another in NFC are short data packets transferred at a relatively slow rate compared to BT technology however. In most applications, the data sent over NFC tends to be small enough so that the transfer speed doesn't become an issue. Strings of numbers, letters, and other small data packets can be sent almost instantaneously by means of NFC. Along with this strength, the user feels confident in the connection between two devices over NFC because, with the short range of 4 cm, the two devices can be placed in literal physical contact for a small moment and the data is either transferred as intended or it is not (in which case the user immediately is aware of another problem). NFC contains almost no software and can operate on small amount of energy supplied by one or both devices.

Referring to FIG. 10, the act of "pairing" components of the invention with BT technology can be used, though usually this is less preferred to NFC pairing. This can happen using the following steps. The flag signaling components are turned on at 600. The components 100 enter the pairing mode at 601. The central receiving component is turned on at 605. The central receiving component enters the pairing-mode at 606 and waits for components to be paired with. In this embodiment the central receiving component 200 is programmed in such a way that it can be set to pairing-Mode at 606 and is indicated as such by an indicator light 204 (FIG. 4). The components 100 are placed near the central receiving component at 602. The components 100 that are deemed (by the users) to be part of the system, are also set to pairing-mode at 601 and are placed near the central receiving component. The flag signaling components are recognized by the central receiving component at 607. The central receiving component then "finds" the intended components 100 and adds their unique ID aka electronic signature to the list of "connected" devices. The components 100 are added to the system. The flag signaling components are paired at 603. The components 100 enter signaling-mode at 604. Mode button 203 (FIG. 4) on the central receiving component is pressed indicating that all intended components 100 have been added at 608. Central receiving component enters signaling-mode at 609. Once all the intended components 100 are connected at 603, the central receiving component will only receive BT signals from said components and will ignore signals from any other source. Leaving the pairing process up to the BT technology would only need this one form of wireless communication, but has other disadvantages. However, this could cut down on the sub-components needed to assemble such a system because the programming for the pairing process and actual performance of the system would be contained within the same SoC. Along with the parts, it could also cut down on the engineering required to program and assemble the system. Using the same wireless communication protocol would provide a manufacturing fluidity that two different technologies would not when BT technology and NFC are both employed in the same referee paging system.

For added clarity, reference is made to FIG. 11, for steps to operate the system when all components within the paired system are in the signaling-mode. While any of the Assistant Referees are pressing the signal button at 703 (the button 103, see FIG. 1), the rumble motor 302 (FIG. 7) within the handle 101 (FIG. 1) is activated, giving haptic feedback to the user. This event also triggers the transmission of the BT signal at 700 that is received at 704 by the central receiving component. This activates the rumble motor 407 (FIG. 8) within the central receiving component, thus alerting the enforcing official. Conversely, while the signal button 103 is not being pressed at 701, 702, then none of the signals or motors are activated.

Each and every document cited in this present application, including any cross referenced or related patent or application, is incorporated in this present application in its entirety by this reference, unless expressly excluded or otherwise limited. The citation of any document is not an admission that it is prior art with respect to any embodiment disclosed in this present application or that it alone, or in any combination with any other reference or references, teaches, suggests, or discloses any such embodiment. Further, to the extent that any meaning or definition of a term in this present application conflicts with any meaning or definition of the same term in a document incorporated by reference, the meaning or definition assigned to that term in this present application governs.

The present invention includes the description, examples, embodiments, and drawings disclosed; but it is not limited to such description, examples, embodiments, or drawings. As briefly described above, the reader should assume that features of one disclosed embodiment can also be applied to all other disclosed embodiments, unless expressly indicated to the contrary. Unless expressly indicated to the contrary, the numerical parameters set forth in the present application are approximations that can vary depending on the desired properties sought to be obtained by a person of ordinary skill in the art without undue experimentation using the teachings disclosed in the present application. Modifications and other embodiments will be apparent to a person of ordinary skill in the packaging arts, and all such modifications and other embodiments are intended and deemed to be within the scope of the present invention.

What is claimed is:

1. A wireless customizable referee paging system with universal and interchangeable components comprising:
    at least two flag signaling components, each flag signaling component having an electronic signature to send a unique flag signal based on a flag user's input for that flag signaling component;
    a central receiving component that receives the unique flag signal from each flag signaling component and then alerts a central user to receipt of the unique flag signal;
    the flag signaling components and the central receiving component each having a Bluetooth® radio circuit and thereby the flag signaling components communicating with the central receiving component substantially exclusively via Bluetooth® technology; and,
    the flag signaling components and the central receiving component each having a pairing-mode and a signaling-mode, wherein in the pairing-mode each flag signaling component is uniquely paired to the central receiving component based on the electronic signature of the flag signaling component and in the signaling-mode each flag signaling component communicates substantially only with the central receiving component to which the flag signaling component is paired for as long as the flag signaling component is paired to that central receiving component.

2. The referee paging system of claim 1 wherein the unique flag signal is encrypted when it communicates between the flag signaling component and the central receiving component.

3. The referee paging system of claim 1 wherein the alert to the central user is done discretely between the central receiving component and the central user.

4. The referee paging system of claim 3 wherein the alert is a vibratory alert to the central user.

5. The referee paging system of claim 1 wherein each flag signaling component comprises a flag alert activated in combination with the unique flag signal.

6. The referee paging system of claim 5 wherein the flag alert is a flag vibratory alert to the flag user.

7. The referee paging system of claim 1 wherein each flag signaling component comprises a flag projecting out an end of the flag signaling component for officiating a sporting event and the user uses a same hand for officiating the sporting event as for sending the unique flag signal.

8. The referee paging system of claim 1 wherein each flag signaling component consists essentially of the following electronic sub-components—a microprocessor in communication with each of: a signal button, a rumble motor, an indicator light, a charging port, a battery, an on/off switch and the Bluetooth® radio circuit.

9. The referee paging system of claim 1 wherein the central receiving component consists essentially of the following electronic sub-components—a microprocessor in communication with each of: a mode button, a rumble motor, an indicator light, a charging port, a battery, an on/off switch and the Bluetooth® radio circuit.

10. The referee paging system of claim 9 wherein each flag signaling component consists essentially of the following electronic sub-components—a microprocessor in communication with each of: a signal button, a rumble motor, an indicator light, a charging port, a battery, an on/off switch and the Bluetooth® radio circuit.

11. The referee paging system of claim 10 wherein each flag signaling component consists essentially of the same type of electronic sub-components as the central receiving component.

12. The referee paging system of claim 1 wherein the pairing-mode comprises pairing the flag signaling components and the central receiving component using NFC technology.

13. The referee paging system of claim 1 wherein the signaling-mode further comprises the central receiving component recognizes substantially only the flag signaling components to which it is paired for as long as those flag signaling components are paired to that central receiving component.

14. A wireless customizable referee paging system with universal and interchangeable components comprising:
   at least two flag signaling components, each flag signaling component having an electronic signature to send a unique flag signal based on a flag user's input for that flag signaling component and each flag signaling component comprises a flag projecting out an end of the flag signaling component for officiating a sporting event and the user uses a same hand for officiating the sporting event as for sending the unique flag signal;
   a central receiving component that receives the unique flag signal from each flag signaling component and then alerts a central user to receipt of the unique flag signal and each flag signaling component comprises a flag alert activated in combination with the unique flag signal;
   the flag signaling components and the central receiving component each having a Bluetooth® radio circuit and thereby the flag signaling components communicating with the central receiving component substantially exclusively via Bluetooth® technology;
   the central receiving component consists essentially of the following electronic sub-components—a microprocessor in communication with each of: a mode button, a rumble motor, an indicator light, a charging port, a battery, an on/off switch and the Bluetooth® radio circuit; and,
   the flag signaling components and the central receiving component each having a pairing-mode and a signaling-mode, wherein in the pairing-mode each flag signaling component is uniquely paired to the central receiving component based on the electronic signature of the flag signaling component and in the signaling-mode each flag signaling component communicates substantially only with the central receiving component to which the flag signaling component is paired for as long as the flag signaling component is paired to that central receiving component.

15. The referee paging system of claim 14 wherein the alert to the central user is done discretely between the central receiving component and the central user and the flag alert is done discretely between the flag signaling component and the flag user.

16. The referee paging system of claim 15 wherein the alert and the flag alert are each a vibratory alert to the respective central user and flag user.

17. The referee paging system of claim 14 wherein each flag signaling component consists essentially of the following electronic sub-components—a microprocessor in communication with each of: a signal button, a rumble motor, an indicator light, a charging port, a battery, an on/off switch and the Bluetooth® radio circuit.

18. The referee paging system of claim 17 wherein each flag signaling component consists essentially of the same type of electronic sub-components as the central receiving component.

19. The referee paging system of claim 14 wherein the pairing-mode comprises pairing the flag signaling components and the central receiving component using NFC technology.

20. The referee paging system of claim 14 wherein the signaling-mode further comprises the central receiving component recognizes substantially only the flag signaling components to which it is paired for as long as those flag signaling components are paired to that central receiving component.

* * * * *

UNITED STATES PATENT AND TRADEMARK OFFICE
CERTIFICATE OF CORRECTION

PATENT NO. : 11,090,545 B2
APPLICATION NO. : 16/705410
DATED : August 17, 2021
INVENTOR(S) : Samuel W. Rall It is certified that error appears in the above-identified patent and that said Letters Patent is hereby corrected as shown below:

In the Claims

Claim 1, Column 10, Line 7 - insert --(i)-- between the words 'components' and 'communicating'.
Claim 1, Column 10, Line 9 - insert --including at least some Bluetooth® 5 protocol and (ii) capable of communication at a separated distance of an entire length of a soccer pitch-- between the word 'technology' and the ';'.

Claim 14, Column 11, Line 23 - insert --(i)-- between the words 'components' and 'communicating'.
Claim 14, Column 11, Line 25 - insert --including at least some Bluetooth® 5 protocol and (ii) capable of communication at a separated distance of an entire length of a soccer pitch-- between the word 'technology' and the ';'.

Signed and Sealed this
Tenth Day of October, 2023

Katherine Kelly Vidal
*Director of the United States Patent and Trademark Office*